United States Patent
Gedrat et al.

[11] Patent Number: 5,841,098
[45] Date of Patent: Nov. 24, 1998

[54] METHOD AND APPARATUS FOR LASER WELDING SECTIONAL MEMBERS ONTO LARGE-FORMAT ALUMINUM STRUCTURAL COMPONENTS

[75] Inventors: Olaf Gedrat; Guenter Kuck, both of Nordenham; Arnold Kolley, Ganderkesee; Gerhard Neye, Stuhr II, all of Germany

[73] Assignee: Daimler-Benz Aerospace Airbus GmbH, Hamburg, Germany

[21] Appl. No.: 851,724

[22] Filed: May 5, 1997

[30] Foreign Application Priority Data

Sep. 27, 1996 [DE] Germany .......... 196 39 667.0

[51] Int. Cl.⁶ .......... B23K 26/10
[52] U.S. Cl. .......... 219/121.63; 219/121.64; 219/121.83
[58] Field of Search .......... 219/121.63, 121.64, 219/121.82, 121.83, 121.81, 121.79

[56] References Cited

U.S. PATENT DOCUMENTS

| | | | |
|---|---|---|---|
| 4,223,201 | 9/1980 | Peters et al. | 219/121.63 |
| 4,223,202 | 9/1980 | Peters et al. | 219/121.63 X |
| 4,644,129 | 2/1987 | Miller | 219/121.63 |
| 4,700,045 | 10/1987 | Merry et al. | 219/121.78 |
| 4,841,617 | 6/1989 | Schmidt et al. | 219/121.64 X |
| 4,924,063 | 5/1990 | Buchel et al. | 219/121.64 |
| 5,001,324 | 3/1991 | Aiello et al. | 219/121.63 |
| 5,045,668 | 9/1991 | Neiheisel et al. | 219/121.83 |
| 5,142,118 | 8/1992 | Schlatter | 219/121.63 |
| 5,483,034 | 1/1996 | Havard et al. | 219/121.64 |

FOREIGN PATENT DOCUMENTS

| | | | |
|---|---|---|---|
| 0310793 | 4/1989 | European Pat. Off. | |
| 0445633 | 9/1991 | European Pat. Off. | 219/121.63 |
| 4446560 | 8/1996 | Germany | |
| 54-100948 | 8/1979 | Japan | 219/121.63 |
| 61-229489 | 10/1986 | Japan | 219/121.64 |
| 63-154283 | 6/1988 | Japan | 219/121.64 |
| 5-154678 | 6/1993 | Japan | 219/121.64 |

OTHER PUBLICATIONS an Article by Peter Heider, entitled "Lasergerechte Konstruktion und lasergerechte Fertigungsmittel zum Schweissen grossformatiger Aluminium–Strukturbauteile"; published by Fortschritt–Berichte VDI Verlag; vol. 2; No.: 326, pp. 1–101, Jul. 1994.

*Primary Examiner*—Gregory L. Mills
*Attorney, Agent, or Firm*—W. F. Fasse; W. G. Fasse

[57] ABSTRACT

A method and apparatus for welding sectional members onto a large-format aluminum structural component using laser beams is especially applicable for welding stringers onto cylindrically or spherically pre-curved fuselage skin components in the construction of aircraft. The apparatus includes an adjustable support arrangement for supporting the large-format structural component, a roller guide and clamping system by which the sectional member, after it has been prepositioned, is guided by a computer numeric control (CNC) system and fixed onto the structural component, and a laser guide system that simultaneously directs two laser beams from two opposite sides of the sectional member onto a weld point along a joint seam between the sectional member and the structural component. The method and apparatus are applicable and readily adaptable with high flexibility to a great variety of geometries of the components to be welded, because the laser guide system is not coupled to the roller guide and clamping system. By means of signals provided by a seam locating and tracking system, the laser guide system automatically guides the laser beams to the actual weld seam position of the components to be welded independently of the motion of the roller guide and clamping system.

20 Claims, 2 Drawing Sheets

METHOD AND APPARATUS FOR LASER WELDING SECTIONAL MEMBERS ONTO LARGE-FORMAT ALUMINUM STRUCTURAL COMPONENTS

FIELD OF THE INVENTION

The invention relates to a method for welding sectional members onto large format aluminum structural components using laser beams, and particularly to a method for laser welding airframe stringers onto the inner surface of cylindrically or spherically curved metal fuselage skin sheets or plates in the field of aircraft construction. The invention also relates to an apparatus for carrying out the method.

BACKGROUND INFORMATION

A known welding method and apparatus of the above described general type are described in an article by Peter Heider entitled "Lasergerechte Konstruktion und lasergerechte Fertigungsmittel zum Schweißen großformatiger Aluminium-Strukturbauteile" ("Laser Compatible Construction and Laser Compatible Manufacturing Means For Welding Large-Format Aluminum Structural Components") published by the VDI Verlag Publishers in VDI Fortschritt-Berichte ("Progress Reports"), Series 2: Fertigungstechnik (Manufacturing Technology), No. 326, dissertation 07/94. In order to manufacture such aluminum structural components, for example in the fuselage-stringer manner of construction, without defects, i.e. without cracks, and without significant component deformation, the above cited article describes a system whereby the T-joint weld seams between the stringers and the fuselage skin are simultaneously welded from both sides of the respective stringer by means of two laser beams. In this regard, see section 6 and especially sections 6.3 and 6.4 (including subsections) of the article. In order to achieve a common weld puddle, the two laser beams are focussed onto two respectively opposite identical positions along the joint to be welded. In this manner, the thermal process, i.e. the development of the temperature pattern in the thermally affected zone and melting of the material in the melt zone, is uniform from both sides of the weld joint, whereby the formation of weld-induced self-stresses in the weld seams is to be minimized.

In this context, the laser compatible manufacturing means include all components that are suitable and adapted for the special application of laser beam welding of the aluminum alloy AlMgSiCu in a T-joint weld configuration. Thus, the laser compatible manufacturing means include a motion drive unit, a machining or working head including a beam guide system and a gas supply system, a clamping arrangement, and a system for supplying filler material, whereby the problem of crack formation is reduced by using heterogenous or dissimilar filler materials such as AlSi12, for example.

The known welding apparatus for the two-sided simultaneous laser welding of stringers onto a fuselage skin, according to the above cited article, comprises a variable or adjustable support system for receiving and supporting the fuselage skin, and a flexible roller guide and clamping system for exactly positioning and then fixing the stringer on the fuselage skin during the welding process. In this context, the lateral guidance of the respective stringer is provided by one roller pair arranged to run before or in front of the laser beam and one roller pair arranged to run behind or after the laser beam. Each one of the two roller pairs comprises a guide roller for determining the lateral position of the stringer and a clamping or counter roller that clamps the stringer laterally against the guide roller. The positioning of the stringer is carried out by the machining or working head, which in turn is driven by a computer numeric control (CNC) program, which orients itself relative to the actual position and orientation of the fuselage skin by means of fixed points provided on the fuselage skin. The pressing or clamping of a respective stringer onto the fuselage skin is achieved by two rollers arranged above the weld point so as to clamp down onto the top edge of the respective stringer. The respective pre-tensioning of the pressing or clamping rollers and of the lateral guide and clamping rollers can be adjusted by means of springs. The relative movement between the working head and the work piece may be carried out by moving the work piece or moving the working head, or both. It is a disadvantage of the known apparatus that the clamping and fixing arrangements are embodied in a particular configuration that is specific to the particular components to be welded. In other words, the known apparatus is not readily adaptable to welding various different components having different configurations.

Furthermore, both the roller pairs of the stringer guide and clamping system and the focussing mirrors of the laser beam deflection system are mounted on the same working head. Namely, the clamping arrangement and the working head are integrated together so that the laser beam guidance and the mechanical guides, i.e. the roller pairs, are rigidly mechanically connected to each other. With this arrangement, the laser beam is intended to mechanically track or follow the weld seam as the working head moves relative to the stringer and the fuselage skin. In other words, due to the mechanical interconnection of the laser beam guidance system and the stringer clamping and guiding system, the laser beam is intended to follow along the weld seam with an acceptable tolerance, and without requiring any sensors that have been used in other clamping system for locating and tracking a seam. In this regard see especially pages 97 and 99 of the article.

In addition to the flexible roller guidance of the stringer as described above, the article also discloses a rigid clamping arrangement, whereby the stringer is rigidly clamped or fixed to the fuselage skin by pressing or clamping screws. Due to the rigid clamping, the article explains, very small tolerances in the position of the laser beam relative to the weld joint are achieved, so that the use of a weld seam tracking system or the like is not necessary. A disadvantage of such a rigid clamping arrangement is that it is of only limited use, if at all, for welding spherically curved components such as some fuselage skin components. In this regard see especially page 95 of the article.

OBJECTS OF THE INVENTION

In view of the above, the invention aims to achieve one or more of the following objects singly or in combination:

to provide a method for laser welding sectional members onto large-format aluminum structural components, such as sheets or panels, which method is flexibly applicable to a great variety of sectional members and aluminum structural components having different geometries;

to provide an apparatus for carrying out such a method, which is readily adaptable to different configurations of components that are to be welded together;

to provide such a method and such an apparatus that automatically correct for any deviation in the location or progression of the welding seam from a corresponding nominal value, by having the laser beam automatically follow the actual seam to be welded rather than tracking along a nominal weld seam path; and to minimize the process-induced stresses in the finished product, by locating and holding the structural components in a nearly tension-free manner relative to one another.

SUMMARY OF THE INVENTION

The above objects have been achieved in a method and apparatus according to the invention, including a variable or adjustable support arrangement for receiving and supporting the large-format structural component such as a fuselage skin sheet or plate, a roller guide and clamping system by which the sectional member that is to be welded onto the structural component is positioned or guided by a 6-axes (X, Y, Z, A, B, C) computer numerical control (CNC) system and is affixed onto the structural component after being pre-positioned thereon, and a laser beam guide system that preferably simultaneously directs two laser beams onto the weld point from two opposite sides of the respective stringer. Especially according to the invention, the two laser beams, and more specifically the components of the laser beam guide system, are decoupled and independent from the roller guide and clamping system. The laser beam guide system is coupled to and controlled by a weld seam locating and tracking system so that the laser beams automatically are guided along the actual position of the seam between the two components that are to be welded together.

An advantage of the invention is that any existing deviations of the joint seam from the intended or nominal position thereof, for example as a result of component dimensional tolerances, thermally induced warping due to the welding process, or mechanically induced warping due to the clamping of the components, is automatically taken into account and corrected for by auxiliary axes (v, q, w) by means of the sensor-based detection of the actual position of the joint seam and the corresponding subsequent automatic tracking movement of the laser beams during the welding process. A further advantage of the invention is that the stresses induced in the components as a necessary result of the process are minimized since the components are positioned with nearly no tension or stress relative to one another.

Further according to the invention, a welding filler material may be supplied to the weld point during the welding process in order to reduce or avoid the occurrence of cracks in the weld seams. Preferably, the supply of the filler material is carried out in a manner that is decoupled from the roller guide and clamping system. The filler material may be provided as a plating or coating deposit on the fuselage skin or on the stringer component between the two components along the joint. Alternatively, the filler material may be provided in the form of a wire that is fed to the weld point as the welding process progresses.

As a further detail of the apparatus for carrying out the method according to the invention, the apparatus includes a CNC system and a seam locating and tracking system that are coupled together in such a manner that the laser beam guide system is controlled by means of the sensor control circuit of the weld seam locating system, coupled to the NC control of the CNC system, and the decoupled roller guide and clamping system is controlled by the NC control of the CNC system.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
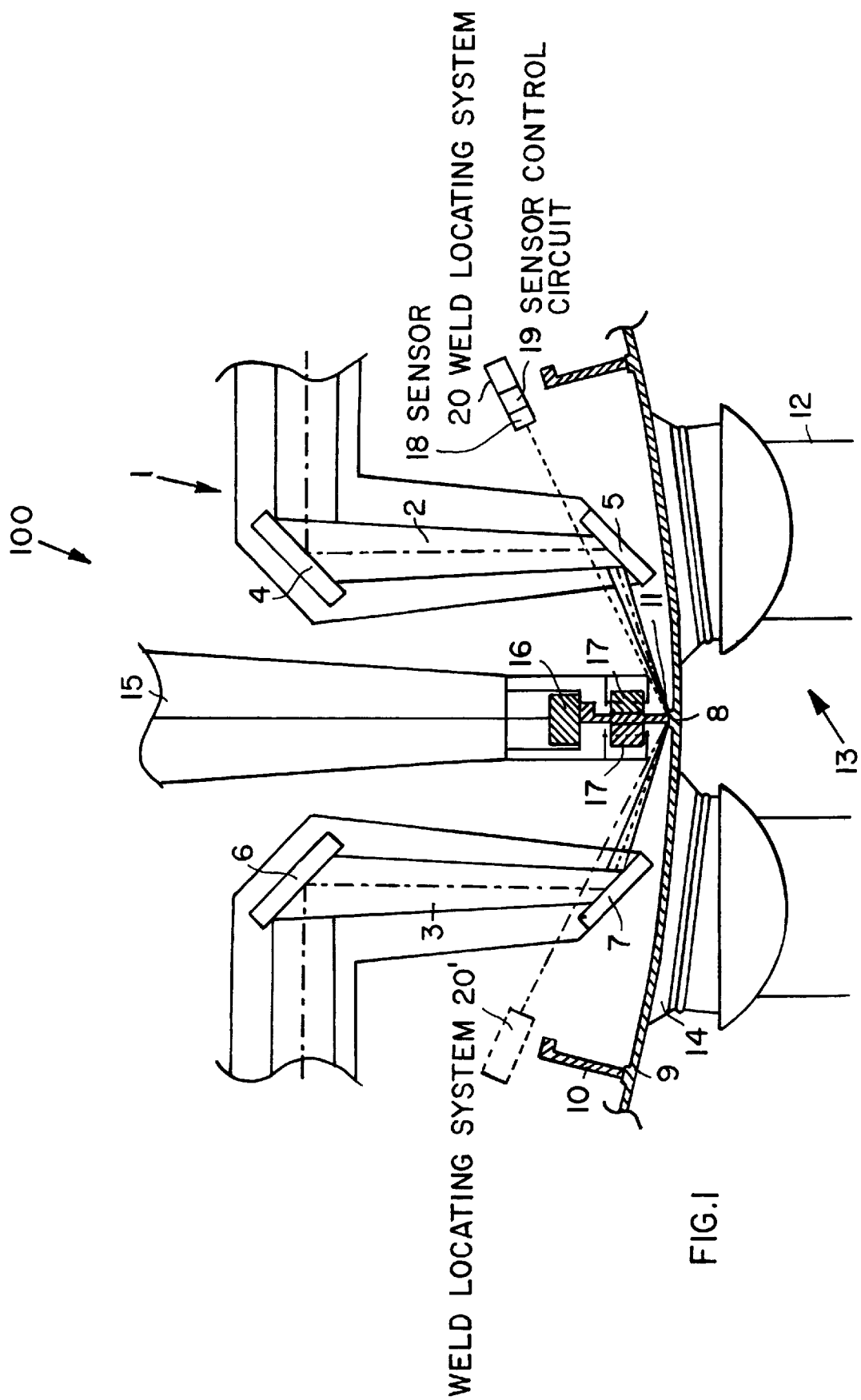
FIG. 1 is a schematic front view showing a portion of an apparatus for welding sectional members onto large-format aluminum structural components according to the invention.

FIG. 1 shows a pertinent portion of a laser welding apparatus 100 including a laser beam guide system 1, a roller guide and clamping system 15, and a component support arrangement 13. Specifically, FIG. 1 shows the components of the present apparatus directly in the proximity of a weld point 8 along the joint seam between a sectional member 10 such as an aircraft fuselage stringer 10 and a structural component 9 such as a fuselage skin sheet or plate 9 to which the stringer 10 is to be welded. The structural component 9 is a large-format sheet-like component that may be cylindrically or spherically curved, and the sectional members or stringers 10 are generally to be welded respectively perpendicularly onto the structural component 9. In the present example embodiment, the structural component 9 is a curved fuselage skin panel of an aircraft fuselage that is, for example, made of AlMgSiCu.

In the present example embodiment, a respective deposit of a heterogenous filler material 11 having a different composition than the parts to be welded, such as AlSi-type for example, is provided between the fuselage skin component 9 and each stringer 10 before the welding process is carried out. During the welding process, the filler material 11 penetrates into and melds with the weld seam and prevents or reduces the formation of cracks. In this example, the filler material 11 is applied as a plating or coating onto the fuselage skin sheet 9 before arranging the stringers 10 on the fuselage skin 9 and before carrying out the welding. In this manner, it is not necessary to provide a separate rate supply of filler material in the form of a wire. However, the same functional principle can be achieved by using a filler material 11 that is provided in the form of a wire during the welding process. In this case, the supply of the wire-form filler material 11 is decoupled from the roller guide and clamping system 15, for example, it may be moved together with the laser beam guide system 1.

To carry out a welding procedure, the pre-curved fuselage skin sheet 9 is first arranged and supported on support elements 12 of the support arrangement 13. The support elements 12 comprise adjustable mount elements 14 that are adjustable and fixable (with any known construction) in such a manner so as to provide an adjustable support surface of the variable support arrangement 13 so that it can surely and uniformly support different structural components 9 having different geometries, in a reproducibly positionable manner.

The roller guide and clamping system 15, which is not mechanically fixed to, i.e. is decoupled from, the laser welding arrangement as mentioned above, is provided for positioning and fixing the respective stringer member 10 onto the fuselage skin component 9 during a welding process. This roller guide and clamping system 15 comprises a first pair of clamping rollers 16 that presses against the upper edge of the stringer member 10 to clamp the stringer member 10 against the fuselage skin component 9, and a lateral guide roller pair 17 for guiding the system along the stringer member 10. Preferably, both roller pairs are in front of the laser beam or weld point 8. A respective guide roller 17 on one side of the stringer member 10 is moved and controlled by the numeric control program in a PC control unit 22 of a CNC system 21 (also see FIG. 2). The corresponding counter roller 17 on the other side of the stringer member 10 presses clampingly toward the first-mentioned guide roller 17 with the respective stringer member 10 therebetween, under a spring tension or a screw-clamping tension.

For carrying out the welding itself, the laser beam guide system 1 includes one or two laser sources (not shown) that emit two laser beams 2 and 3, which are simultaneously directed to the weld point 8 from two opposite sides of the stringer 10, respectively by means of deflecting mirrors 4 and 5 for the laser beam 2 and deflecting mirrors 6 and 7 for the laser beam 3.

The roller guide and clamping system 15 and the laser beam guide system 1 are not fixed or linked to each other, and instead are movable independently of one another relative to the fuselage skin component 9 and stringer members 10. The relative motion necessary to carry out the welding can involve either holding the fuselage skin component 9 stationary while moving the roller guide and clamping system 15 and the laser beam guide system 1, or holding the apparatus systems stationary while moving the fuselage skin component 9, or moving both the fuselage skin component 9 and the apparatus systems 1 and 15 relative to each other. The relative movement of the roller guide and clamping system 15 relative to the fuselage skin component 9 and the stringer member 10 is carried out and controlled by means of the NC control 22 of the CNC system 21. The relative motion of the laser beam guide system 1 relative to the fuselage skin component 9 and the stringer member 10 is carried out and controlled by a sensor control circuit 19 of a seam locating and tracking system 20 and by the NC control 22 of the CNC system 21.

The seam locating and tracking system 20 for controlling the relative motion of the laser beam guide system 1 includes a sensor 18 as shown in FIG. 1. The sensor 18 is preferably an optical sensor but could be any other known type of sensor that is able to sense and locate the joint seam. The sensor 18 determines the actual position data defining the positions of the components during the process of a welding procedure. The sensor system or seam locating system 20 senses and detects the complete contour of the components in the area of the joint between the fuselage skin component 9 and the stringer member 10, so as to provide both horizontal and vertical position information.

As shown in FIG. 1, a single weld locating system 20 may be provided on only one side of the stringer member 10, in which case both laser beams 2 and 3 will be controlledly moved together based on the position data provided by the single sensor system 20. Alternatively, as shown by dashed lines as a further optional embodiment in FIG. 1, a second sensor system 20' can be provided on the opposite side of the stringer member 10. In this case, the two laser beams 2 and 3 may be controlled independently of each other, i.e. the movement of the laser beam 2 would be controlled based on the position data provided by the sensor system 20, and the laser beam 3 would be controlled based on the position data provided by the sensor system 20'.

The seam locating and tracking system 20, and particularly the sensor 18 thereof, is positioned at a certain defined spacing distance offset from the welding point 8, preferably upstream of the weld point 8 as it moves along the seam. This offset spacing distance is adjusted relative to the position of the upper guide roller pair 16, in order to ensure the same clamping force conditions at the welding point 8 as at the sensor measuring point. Thus, for example, a center point directly between the welding point 8 and the measuring point of the sensor 18 will correspond to the center between the rollers of the roller pair 16.

The seam locating and tracking system 20 further includes a sensor control circuit 19 connected to an output of the sensor 18. As shown further in FIG. 2, the sensor control circuit 19 receives as first and second inputs the actual position data 18' that are output from the sensor 18, and the nominal position data 22' that are output from the NC control embodied in a PC 22 of the CNC system 21. The sensor control circuit 19 compares the two input signals 18' and 22' and accordingly provides an output signal 19' to the PLC (programming logic control) circuit of the CNC system 21. The nominal position data output by the PC 22 define the desired or nominal position of the stringer member 10 and the fuselage skin component 9 that are to be welded together. The output signal 19' of the sensor control circuit 19 provides adjustment data or positioning control data for auxiliary axes v, q, and w to the PLC control of the CNC system 21. Depending on the efficiency of the different electronic devices the calculation of the output signal 19' based on the signals 18' and 22' can be made directly by the PC 22.

Figure 2:
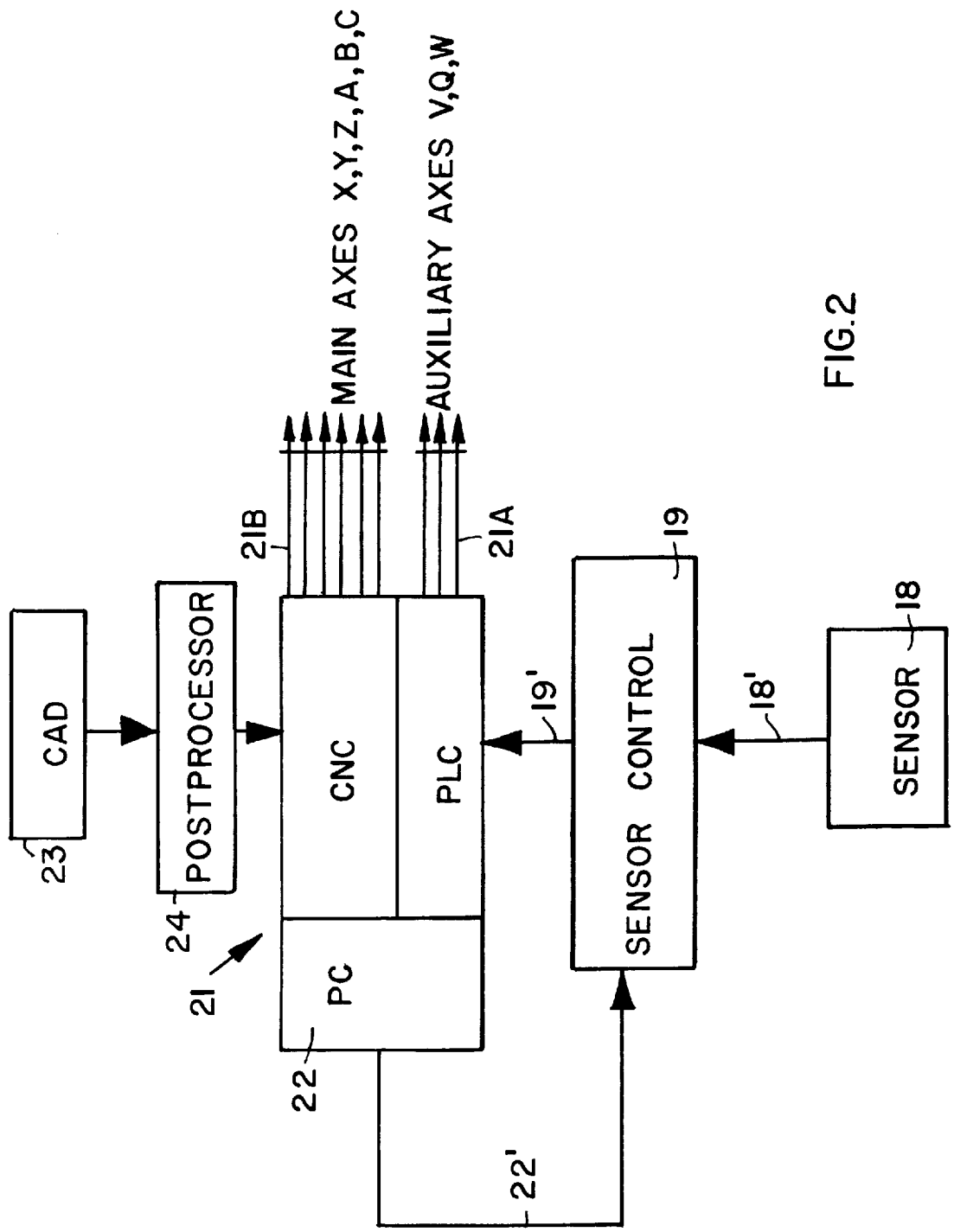
FIG. 2 is a block circuit diagram of a circuit arrangement for controlling the apparatus shown in FIG. 1.

Since the weld point 8 and the sensor measurement point do not exactly coincide with one another, i.e. are offset as described above, the horizontal and vertical position data provided by the sensor 20 comprise geometrically intended components and tolerance or process dependent components, so that the former components must be eliminated for determining the adjustment magnitudes or adjustment signal data for the auxiliary axes v, q, and w. This is achieved by the computational operation in the sensor control circuit 19 after the nominal value data have been provided. As shown in FIG. 2, the nominal value data are provided by the PC 22 of the CNC system 21 based on input data that have been provided by a computer aided design (CAD) 23 that has been input and processed in a post processor 24 to provide a corresponding signal to the CNC system 21. As further shown in FIG. 2, the CNC system 21 also directly provides control signals for the main axes X, Y, Z, A, B, and C.

Although the invention has been described with reference to specific example embodiments, it will be appreciated that it is intended to cover all modifications and equivalents within the scope of the appended claims.

What is claimed is:

1. A method of laser welding a sectional member onto a large-format plate component, comprising the following steps:
    a) pre-positioning said sectional member on said plate component;
    b) positioning said sectional member into a desired weld position on said plate component by contacting said sectional member with at least one guide roller, and pressing said sectional member against said plate component in said desired weld position using at least one clamping roller;
    c) determining an actual position of a seam between said plate component and said sectional member pressed thereagainst using at least one weld seam locating sensor; and
    d) generating at least one laser beam and directing said at least one laser beam at a weld point along said seam using a laser beam guide system, wherein said laser beam guide system is movable independently of said guide roller and said clamping roller, and wherein said directing of said at least one laser beam is carried out dependent upon and responsive to said actual position of said seam determined by said weld seam locating sensor.

2. The method of claim 1, wherein said plate component is an aluminum aircraft fuselage plate having a cylindrically or spherically curved configuration, and wherein said sectional member is an air frame stringer, and further comprising before said step b) an additional step of arranging said fuselage plate to be supported on an adjustable support arrangement that is adjustably adapted to said cylindrically or spherically curved configuration.

3. The method of claim 1, wherein said at least one clamping roller applies onto an upper edge of said sectional member a pressing force that is directed substantially perpendicularly to said plate component at said desired weld position, and said at least one guide roller applies onto a first lateral side of said sectional member a guiding force that is directed substantially perpendicularly to said pressing force, and further including at least one guide counter roller contacting a second lateral side of said sectional member opposite said at least one guide roller.

4. The method of claim 3, wherein said at least one guide roller includes two guide rollers and said at least one counter roller includes two counter rollers, arranged as two roller pairs respectively including a respective one of said guide rollers and a respective one of said counter rollers, with said two roller pairs spaced apart from each other along a lengthwise direction of said sectional member such that said weld point is between said spaced apart roller pairs.

5. The method of claim 1, wherein said step of positioning said sectional member comprises positively moving said guide roller into a proper position under control of a CNC system to contact and position the sectional member into said desired weld position.

6. The method of claim 1, wherein said step of generating and directing at least one laser beam comprises generating two laser beams and simultaneously directing said two laser beams at said weld point respectively from two opposite lateral sides of said sectional member.

7. The method of claim 6, wherein said step c) comprises using only a single weld seam locating sensor, and said directing of said two laser beams is carried out in synchronism for both of said two laser beams dependent upon and responsive to said actual position of said seam determined by said single weld seam locating sensor.

8. The method of claim 6, wherein said step c) comprises using two weld seam locating sensors, and said directing of said two laser beams is carried out independently for said two laser beams respectively dependent upon and responsive to said respective actual position determined by said two weld seam locating sensors.

9. The method of claim 1, further comprising moving said at least one guide roller, said at least one clamping roller, and said laser beam guide system along a lengthwise direction of said sectional member, and repeating said steps b), c), and d) along said lengthwise direction of said sectional member.

10. The method of claim 9, wherein said steps b), c) and d) are repeated in a continuous maintained manner along said lengthwise direction of said sectional member.

11. The method of claim 9, wherein said at least one guide roller and said at least one clamping roller are mechanically coupled to each other for moving together along said lengthwise direction, and wherein said moving of said laser beam guide system is carried out independently of said moving of said at least one guide roller and said at least one clamping roller.

12. The method of claim 11, further comprising laterally moving said at least one guide roller perpendicularly to said lengthwise direction to carry out said positioning of said sectional member, controlling said moving of said at least one guide roller and said at least one clamping roller along said lengthwise direction and said lateral moving of said at least one guide roller using a CNC system, and controlling said moving of said laser beam guide system and said directing of said at least one laser beam using said CNC system and a sensor control circuit evaluating a signal output of said weld seam locating sensor.

13. The method of claim 1, further comprising controlling said positioning and said pressing in said step b) using a CNC system, and controlling said directing of said at least one laser beam in said step d) using said CNC system and a sensor control circuit evaluating a signal output of said weld seam locating sensor.

14. The method of claim 1, wherein said step c) further comprises directing said weld seam locating sensor at a sensor point along said seam, wherein said sensor point is offset from said weld point.

15. The method of claim 14, wherein a center of pressing force applied to said sectional member by said at least one clamping roller in said step b) is located centrally between said sensor point and said weld point.

16. The method of claim 1, further comprising a step of supplying a weld filler material to said weld point independently of and decoupled from said guide roller and said clamping roller.

17. The method of claim 1, further comprising a preliminary step of applying a weld filler material as a coating strip onto said plate component or onto said sectional member at said desired weld position.

18. An apparatus for laser welding a sectional member onto a large-format plate component, comprising:
- a support arrangement adapted to supportingly receive said plate component thereon,
- a guide and clamping roller system including at least one guide roller that is movably arranged and adapted to contact said sectional member to position said sectional member into a desired weld position on said plate component and at least one clamping roller that is movably arranged and adapted to press said sectional member against said plate component,
- a seam locating sensor arranged and directed to be able to detect an actual location of a seam between said sectional member and said plate component,
- a laser beam guide system that is adapted to direct at least one laser beam at a weld point along said seam, and
- an electronic control system connected to an output of said seam locating sensor and connected for control signal transmission to said laser beam guide system,
- wherein said laser beam guide system is not mechanically fixed to said guide and clamping roller system, and is movable independently of said guide and clamping roller system responsive to said output of said seam locating sensor through said electronic control system.

19. The apparatus of claim 18, wherein said electronic control system comprises a CNC system and a sensor control circuit, wherein said sensor control circuit is connected so as to receive nominal position data from said CNC system and to receive actual position data from said sensor and so as to output positioning adjustment data to said CNC system, wherein said laser beam guide system is connected to said CNC system to receive first control signals therefrom based on said positioning adjustment data from said sensor control circuit, and wherein said guide and clamping roller system is connected to said CNC system to receive second control signals therefrom based on nominal roller position data.

20. The apparatus of claim 19, wherein said CNC system includes a PC-control unit, wherein said PC-control unit is connected to said laser beam guide system and to said guide and clamping roller system.

* * * * *